(12) United States Patent
Tait (10) Patent No.: US 11,001,170 B2
(45) Date of Patent: *May 11, 2021

(54) OCCUPANT SUPPORT

(71) Applicant: Faurecia Automotive Seating, LLC, Auburn Hills, MI (US)

(72) Inventor: Shaun D. Tait, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,868

(22) Filed: Sep. 17, 2019

(65) Prior Publication Data
US 2021/0078450 A1 Mar. 18, 2021

(51) Int. Cl.
*B60N 2/34* (2006.01)
*B60N 2/02* (2006.01)
*B60N 2/90* (2018.01)
*B60N 2/62* (2006.01)

(52) U.S. Cl.
CPC ............ *B60N 2/0292* (2013.01); *B60N 2/34* (2013.01); *B60N 2/62* (2013.01); *B60N 2/976* (2018.02); *B60N 2/995* (2018.02)

(58) Field of Classification Search
CPC ...... B60N 2/0292; B60N 2/976; B60N 2/995; B60N 2/34; B60N 2/62
See application file for complete search history.

(56) References Cited

U.S. PATENT DOCUMENTS

| 5,031,563 | A | * | 7/1991 | Matre | ................ B62D 33/0612 |
| | | | | | 114/188 |
| 6,010,190 | A | | 1/2000 | Downey | |
| 6,113,187 | A | | 9/2000 | Sugiyama | |
| 6,209,956 | B1 | * | 4/2001 | Dryburgh | ............. A47C 1/0352 |
| | | | | | 297/245 |
| 7,273,254 | B2 | | 9/2007 | Fujita | |
| 7,303,226 | B2 | * | 12/2007 | Bernstein | ................ B60N 2/14 |
| | | | | | 296/190.01 |
| 8,888,189 | B2 | * | 11/2014 | Tamura | .................. B60N 2/067 |
| | | | | | 297/423.19 |
| 9,174,556 | B2 | * | 11/2015 | Yin | .................... B64D 11/0648 |
| 9,463,717 | B2 | | 10/2016 | Yin | |
| 9,662,999 | B2 | * | 5/2017 | Johnson | .................... B60N 2/01 |
| 10,752,132 | B2 | * | 8/2020 | Fitzpatrick | ............ B60N 3/001 |
| 2016/0332539 | A1 | * | 11/2016 | Rawlinson | ........... B60N 2/0248 |

FOREIGN PATENT DOCUMENTS

EP 2565074 3/2013

* cited by examiner

*Primary Examiner* — Philip F Gabler
(74) *Attorney, Agent, or Firm* — Barnes & Thornburg LLP (57) ABSTRACT

An occupant support system includes a first vehicle seat and a second vehicle seat. The second vehicle seat is spaced apart from the first vehicle seat.

18 Claims, 4 Drawing Sheets

OCCUPANT SUPPORT

BACKGROUND

The present disclosure relates to an occupant support system, and particularly to an occupant support system including a first vehicle seat and a second vehicle seat. More particularly, the present disclosure relates to an occupant support system in which the first and second vehicle seats may be reconfigured.

SUMMARY

According to the present disclosure, an occupant support system includes a first vehicle seat and a second vehicle seat. The first vehicle seat is configured to change between a first position and a second position. The second vehicle seat is spaced apart from the first vehicle seat to define a space therebetween.

In illustrative embodiments, the occupant support system further includes a leg-support system coupled to one of the first vehicle seat and the second vehicle seat. The leg-support system is configured to change between a stowed arrangement and an in-use arrangement in response to an input. In the stowed arrangement, the leg-support system is in confronting relation to one of the first vehicle seat and the second vehicle seat and located outside the space therebetween. In the in-use arrangement, the leg-support system is arranged to extend into the space between the first vehicle seat and the second vehicle seat to support part of a lower body of an occupant resting on the occupant support system.

In the illustrative embodiments, the leg-support system includes a control unit coupled to the first vehicle seat, the second vehicle seat, and the leg-support system and a leg-support mechanism coupled to the control unit and the corresponding vehicle seat. The control unit is configured to provide a command in response to the input to change the leg-support mechanism between the stowed and in-use arrangements.

In the illustrative embodiments, the leg-support mechanism includes a leg-support base configured to move between a retracted positon and an extended position and an actuator coupled to the leg-support base and the control unit to cause the leg-support base to move between the retracted and extended positions when the control unit receives the input. The leg-support base is in the retracted position when the leg-support system is in the stowed arrangement. The leg-support base is in the extended position when the leg-support system is in the in-use arrangement.

In the illustrative embodiments, the leg-support mechanism further includes a pivot unit coupled to the actuator and arranged to extend between and interconnect one of the first vehicle seat and the second vehicle seat and the leg-support base. The pivot unit causes the leg-support base to rotate about a pivot axis when the leg-support bases moves between the retracted and extended positions.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 5:
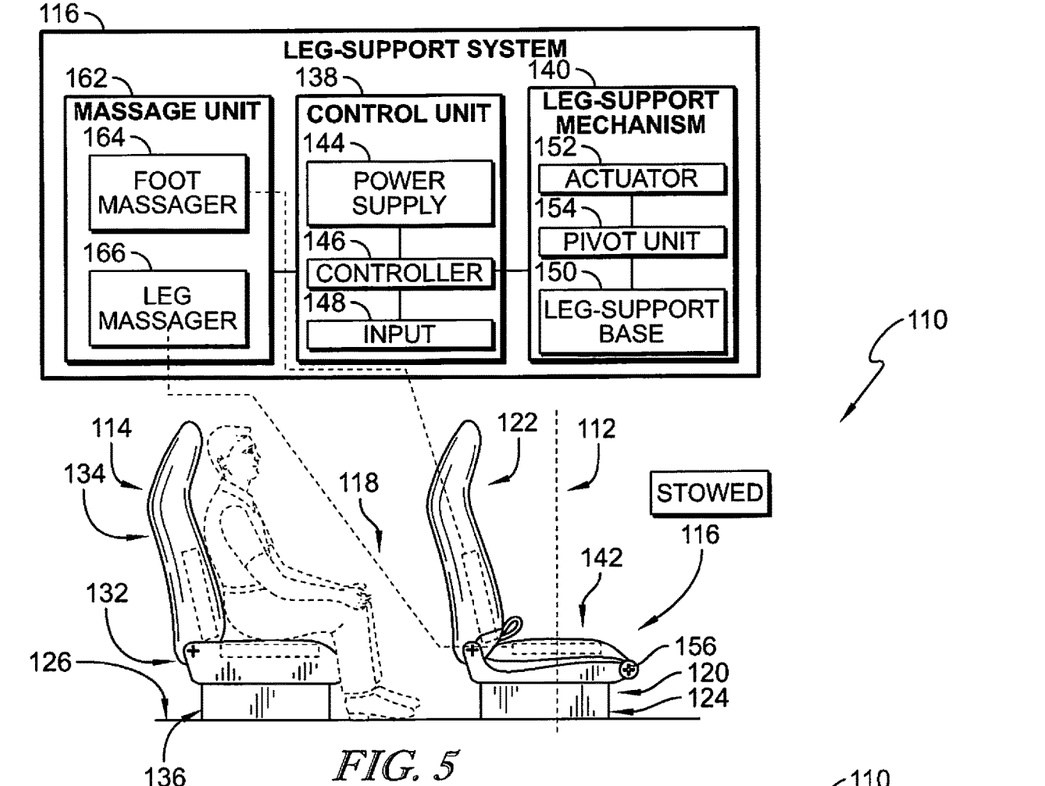
FIG. 5 is a diagrammatic and elevation view of a second embodiment of an occupant support system in accordance with the present disclosure showing that the occupant support system includes a first vehicle seat configured to change between a first positon as shown in FIG. 5 and a second position as shown in FIG. 6, a second vehicle seat spaced apart from the first vehicle seat, and a leg-support system coupled to the first vehicle seat and configured to change between a stowed arrangement as shown in FIG. 5 and an in-use arrangement as shown in FIG. 6.
Figure 6:
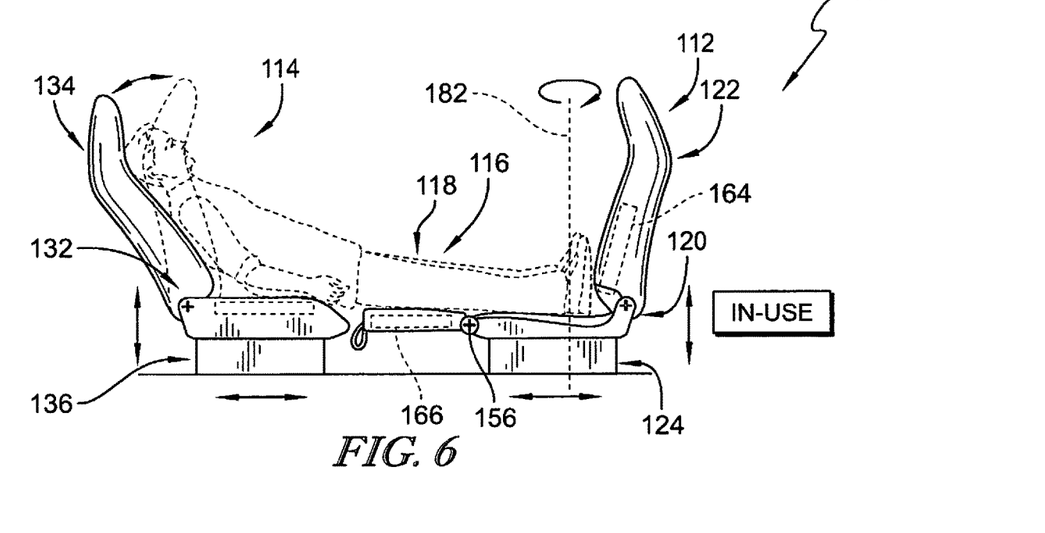
FIG. 6 is view similar to FIG. 5 showing the first vehicle seat changed to the second position and the leg-support system changed to the in-use arrangement.

A first embodiment of an occupant support system 10 is shown in FIGS. 1-4 and 7-8. The occupant support system 10 includes a first vehicle seat 12, a second vehicle seat 14, and a leg-support system 16 configured to change between a stowed arrangement as suggested in FIG. 1 and an in-use arrangement as suggested in FIG. 3. A second embodiment of an occupant support system 110 is shown in FIGS. 5 and 6.

Figure 1:
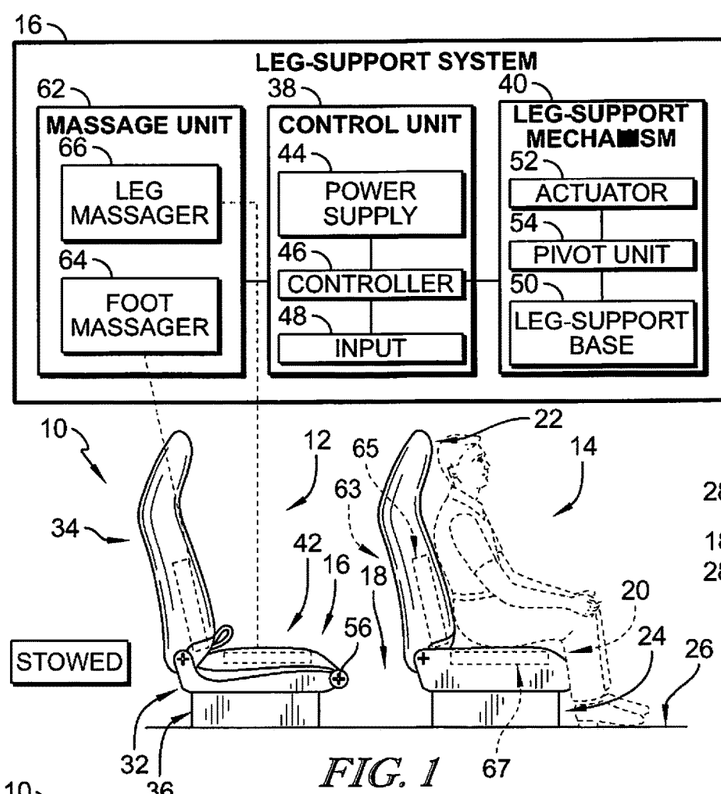
FIG. 1 diagrammatic and elevation view of an occupant support system in accordance with the present disclosure showing the occupant support system includes a first vehicle seat, a second vehicle seat spaced apart from the first vehicle seat, and a leg-support system coupled to the second vehicle seat and configured to change between a stowed arrangement as shown in FIG. 1 and an in-use arrangement as shown in FIG. 3.
Figure 2:
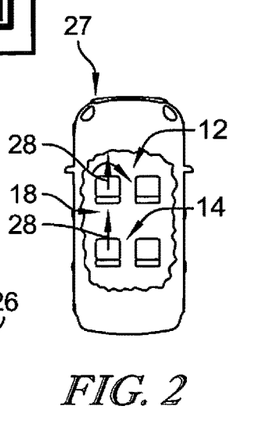
FIG. 2 is a top view of the occupant support system of FIG. 1 installed in a vehicle suggesting the first vehicle seat is configured to change between a first position as shown in FIG. 2 and a second position as shown in FIG. 4.
Figures 3, 4:
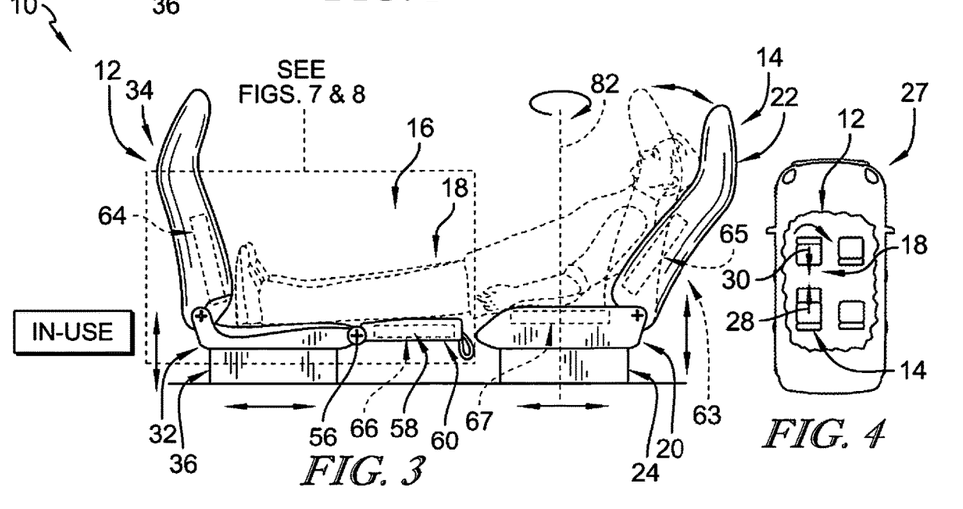
FIG. 3 is view similar to FIG. 1 showing the leg-support system changed to the in-use arrangement.
FIG. 4 is view similar to FIG. 2 showing the first vehicle seat changed to the second position.

An occupant support system 10 is shown in FIGS. 1-4. The occupant support system 10 includes a first vehicle seat 12, a second vehicle seat 14, and a leg-support system 16 as shown in FIGS. 1-4. The second vehicle seat 14 is spaced apart from the first vehicle seat 12 to define a space 18 therebetween. The leg-support system 16 is coupled to the second vehicle seat 14 and is configured to change between a stowed arrangement as shown in FIG. 1 and an in-use arrangement as shown in FIG. 3. The leg-support system 16 is in the in-use arrangement when the leg-support system 16 is located in the space 18 between the first vehicle seat 12 and the second vehicle seat 14 to support part of a lower body of an occupant in the occupant support system 10. The leg-support system 16 is in the stowed arrangement when the leg-support system 16 is in confronting relation to the second vehicle seat 14 and located outside the space 18 between the vehicle seats 12, 14.

The first vehicle seat 12 includes a seat bottom 20, a seat back 22, and a seat foundation 24 as shown in FIGS. 1 and 3. The seat back 22 is coupled to the seat bottom 20. The seat foundation 24 is arranged to extend between and interconnect the seat bottom 20 to a floor 26 of a vehicle 27 to cause the seat bottom 20 and the seat back 22 to move between a first position as shown in FIGS. 1 and 2 and a second position as shown in FIGS. 3 and 4. The first vehicle seat 12 is in the first position when the seat bottom 20 and seat back 22 are arranged to face a first direction 28. The first vehicle seat 12 is in the second position when the seat bottom 20 and seat back 22 are arranged to face a second direction 30 different from the first direction 28.

The second vehicle seat 14 includes a seat base 32, a seat back 34, and a seat foundation 36 as shown in FIGS. 1 and 3. The seat back 34 is coupled to the seat base 32 to face the first direction. The seat foundation 36 is arranged to extend between and interconnect the seat base 32 to the floor 26 of the vehicle 27 to cause the second vehicle seat 14 to move back and forth and up and down relative to the floor 26 of the vehicle 27.

The first vehicle seat 12, the second vehicle seat 14, and the leg-support system 16 cooperate to support an occupant in the occupant support system 10 when the first vehicle seat 12 is in the second position and the leg-support system 16 is in the in-use arrangement as shown in FIG. 3. The leg-support system 16 is configured to support part of the lower body of the occupant that extends into the space 18 when the first vehicle seat 12 is in the second position.

The leg-support system 16 includes a control unit 38 and a leg-support mechanism 40 as shown in FIGS. 1 and 3. The control unit 38 is coupled to the first vehicle seat 12, the second vehicle seat 14, and the leg-support mechanism. The leg-support mechanism 40 is coupled to the seat base 32 and configured to cooperate with the seat base 32 to form a seat bottom 42 of the second vehicle seat 14 when the leg-support system 16 in in the stowed arrangement. The leg-support mechanism 40 is also coupled to the control unit 38 to receive a command from the control unit 38. The command from the control unit 38 may be configured to cause the leg-support mechanism 40 to change between the stowed arrangement and the in-use arrangement. In some embodiments, the command from the control unit 38 may also be configured to cause the first vehicle seat 12 to change between the first and second positions.

The control unit 38 includes a power supply 44, a controller 46, and an input 48 as shown in FIG. 1. The power supply 44 is coupled to the first vehicle seat 12, the second vehicle seat 14, and the leg-support mechanism 40 to selectively supply power to one of the first vehicle seat 12, the second vehicle seat 14, and the leg-support mechanism 40 in response to the command from the controller 46. The controller 46 is coupled to the power supply 44 and is configured to provide the command in response to receiving the input 48 from the occupant.

The input 48 may be, for example, a user input such a activating a switch such as, a button, a software based switch such as a touchscreen, or any other suitable alternative. The input 48 may also be, for example, a manual input such as lever or handle coupled to the leg-support mechanism 40 to cause the leg-support mechanism 40 to change between the stowed and in-use arrangements.

The leg-support mechanism 40 includes a leg-support base 50 and an actuator 52 as shown in FIGS. 1 and 3. The leg-support base 50 moves between a retracted positon when the leg-support system 16 is in the stowed arrangement and an extended position when the leg-support system 16 is in the in-use arrangement. The actuator 52 is coupled to the leg-support base 50 and the control unit 38 to cause the leg-support base 50 to move between the retracted and extended positions when the control unit 38 receives the input 48.

In some examples, the actuator 52 is a lever that the occupant may apply the input 48 to cause the leg-support mechanism 40 to change between the stowed and in-use arrangements. In other examples, the actuator 52 is one of a spring, electronic actuator, or a gas shock actuator. In other examples, the actuator 52 is a worm gear and the leg-support system 16 further includes a motor coupled to the control unit 38 and configured to rotate the actuator 52 to cause the leg-support mechanism 40 to change between the stowed and in-use arrangements.

In some examples, the leg-support mechanism 40 further includes a pivot unit 54 as shown in FIGS. 1 and 3. The pivot unit 54 is coupled to the actuator 52 and arranged to extend between and interconnect the seat base 32 and the leg-support base 50. The pivot unit 54 causes the leg-support base 50 to rotate about a pivot axis 56 when the leg-support system 16 moves between the retracted and extended positions.

In other examples, leg-support mechanism 40 is configured to slide relative to the seat base 32 between the retracted and extended positions. In other examples, the leg-support mechanism 40 is configured to swing out relative to the seat base 32 parallel to the floor 26 of the vehicle 27 between the retracted and extended positions.

The leg-support base 50 includes a leg-support cushion 58 and a leg-support cover 60 as shown in FIGS. 1 and 3. The leg-support cover 60 is configured to extend around the leg-support cushion 58. The leg-support cover 60 is made of a protective material to protect the leg-support cushion 58 from dirt or other contaminants that may be on shoes of the occupant.

In some examples, the leg-support system 16 further includes a massage unit 62 as shown in FIGS. 1 and 3. The massage unit 62 is coupled to the second vehicle seat 14 and the control unit 38.

In other embodiments, the first vehicle seat 12 includes a massage unit 63 as suggested in FIGS. 1 and 3. The massage unit 63 is coupled to the first vehicle seat 12 and the control unit 38.

The massage unit 62 includes a foot massager 64 and a leg massager 66 as shown in FIGS. 1 and 3. The foot massager 64 is coupled to the seat back 34 of the second vehicle seat 14. The leg massager 66 is coupled to the leg-support base 50.

The foot massager 64 is configured to massage feet of the occupant when the occupant is in the first vehicle seat 12 when the first vehicle seat 12 is in the second position and the leg-support system 16 is in the in-use arrangement. In some examples, the foot massager may also provide a heating or cooling sensation. The foot massager 64 may also be configured to massage a back of the occupant when the occupant is in the second vehicle seat 14.

The massage unit 63 includes a back massager 65 and a seat massager 67 as suggested in FIGS. 1 and 3. The back massager 65 is coupled to the seat back 22 of the first vehicle seat 12 and configured to massage a back of the occupant when the occupant is in the first vehicle seat 12. The seat massager 67 is coupled to the seat bottom 20 and configured to massage a seat of the occupant when the occupant is in the first vehicle seat 12.

In some examples, the foot massager 64 and the leg massager 66 of the massage unit 62, as well as the back massager 65 and the seat massager 67 of the massage unit 63 are pneumatic massagers with bladders that are configured to inflate and deflate to massage the occupant. In other examples, the massagers 64, 66, 65, 67 of each of the massage units 62, 64 are mechanical massagers with rotating components that are configured to massage the occupant. In other examples, the massagers 64, 66, 65, 67 of each of the massage units 62, 64 are mechanical massagers with linearly-moving components that are configured to massage the occupant.

Figure 7:
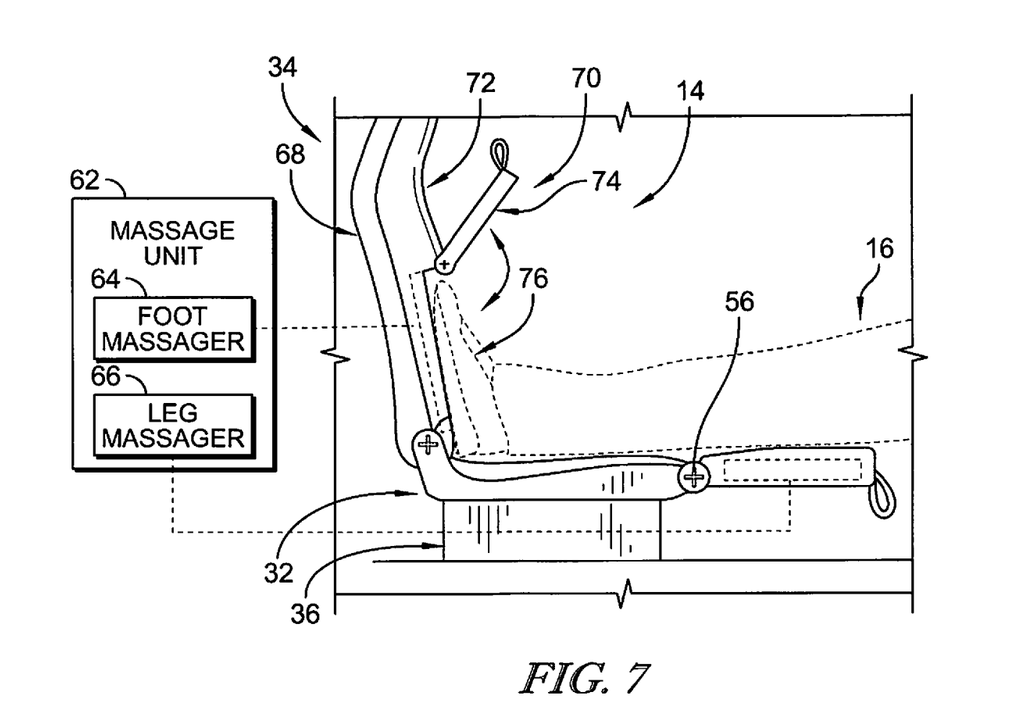
FIG. 7 is a detail view of the occupant support of FIG. 3 showing the leg support system includes a massage unit having a foot massager coupled to a seat back of the second vehicle seat and a leg-massager coupled to leg-support system, and further showing the seat back of the second vehicle seat includes a stationary backrest support and a moveable backrest support coupled to the stationary backrest support and configured to move relative to the stationary backrest support between an open position as shown in FIG. 7 and a closed position as shown in FIG. 8.
Figure 8:
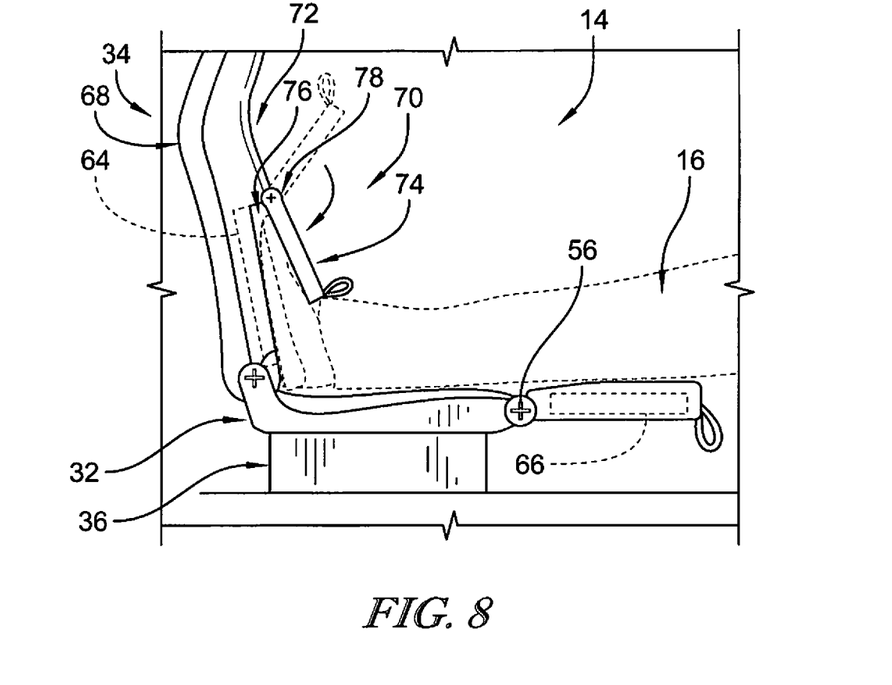
FIG. 8 is a view similar to FIG. 7 showing the moveable backrest support changed to the closed position.

In some embodiments, seat back 34 of the second vehicle seat 14 includes a seat-back frame 68 and a backrest 70 as shown in FIGS. 7 and 8. The seat-back frame 68 is coupled to the seat base 32 of the second vehicle seat 14. The backrest 70 is coupled to the seat-back frame 68 and configured to support the back of an occupant in the second vehicle seat 14.

The backrest 70 includes a stationary backrest support 72 and a moveable backrest support 74 as shown in FIGS. 7 and 8. The stationary backrest support 72 is fixed to the seat-back frame 68 and shaped to define an opening 76. The moveable backrest support 74 is coupled to the stationary backrest support 72 and configured to move between an open positon as shown in FIG. 7 and a closed positon as shown in FIG. 8.

The moveable backrest support 74 is in the closed position when the moveable backrest support 74 fits within the opening 76 in the stationary backrest support 72. The moveable backrest support 74 and stationary backrest support 72 cooperate to support the back of the occupant in the second vehicle seat 14 when the moveable backrest support 74 is in the closed position. The moveable backrest support 74 is in the open position when the moveable backrest support 74 is spaced apart from the opening 76 in the stationary backrest support 72 to allow access to the opening 76 in the stationary backrest support 72.

In some examples, the foot massager 64 is coupled to the stationary backrest support 72 within the opening 76 as shown in FIGS. 7 and 8. The foot massager 64 is arranged within the opening 76 so that the moveable backrest support 74 selectively blocks access to the foot massager 64 when the moveable backrest support 74 moves between the open and closed positions.

In some examples, the backrest 70 further includes a backrest pivot unit 78 as shown in FIGS. 7 and 8. The backrest pivot unit 78 is arranged to extend between and interconnect the stationary backrest support 72 and the moveable backrest support 74. The backrest pivot unit 78 extends between and interconnects the backrest supports 72, 74 to cause the moveable backrest support 74 to rotate about a backrest pivot axis 80 when the moveable backrest support 74 moves between the closed and open positions. In other examples, the moveable backrest support 74 is configured to slide relative to the seat back 34 between the open and closed positions.

Figure 9:
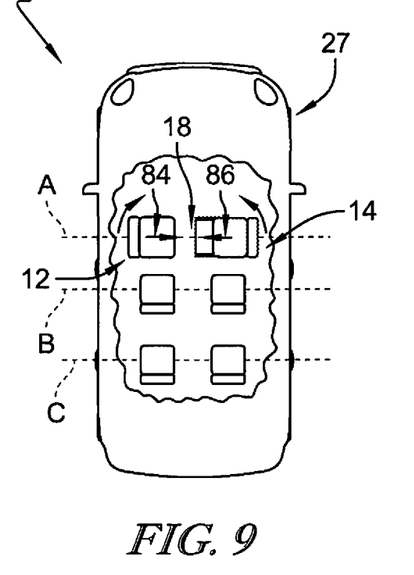
FIG. 9 is a view similar to FIG. 2 showing the second vehicle seat is arranged beside the first vehicle seat and that first vehicle seat is configured to change between the first position as shown in FIG. 2 and a third position as shown in FIG. 9.
Figure 10:
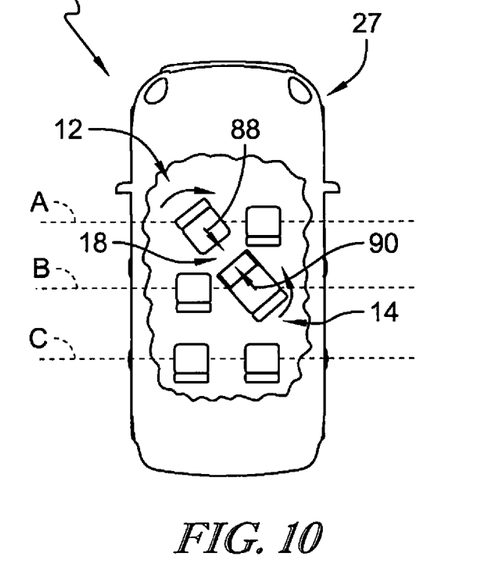
FIG. 10 is a view similar to FIG. 9 showing the second vehicle seat is arranged diagonally from the first vehicle seat and the first vehicle seat is configured to change between a first position as shown in FIG. 2 and a fifth position as shown in FIG. 10.
Figure 11:
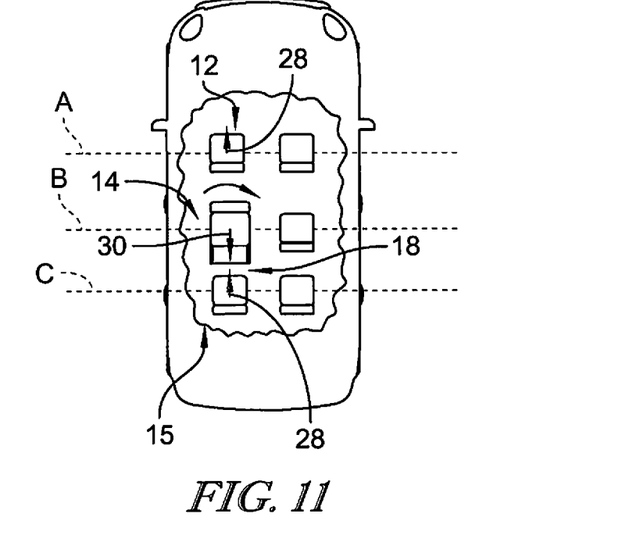
FIG. 11 is a view similar to FIG. 10 showing the second vehicle seat is arranged behind the first vehicle seat and in front of a third vehicle seat and the second vehicle seat is configured to change between a first position as shown in FIG. 2 and the second position as shown in FIG. 11.

In some examples, the vehicle 27 includes a first row axis A, a second row axis B, and a third row axis C as shown in FIGS. 9-11. The third row axis C is spaced apart from the first row axis A. The second row axis is spaced apart from the first row axis A and the third row axis C in between the first and third row axes A, C. Each row axis A, B, C has a plurality of vehicle seats.

In some examples, the second vehicle seat 14 is arranged on the second row axis B and is spaced behind the first vehicle seat 12, which lies on the first row axis A as shown in FIG. 2. The second vehicle seat 14 is arranged behind the first vehicle seat 12 such that the second vehicle seat 14 is in the first position and arranged to face the first direction 28 toward the first vehicle seat 12.

In some examples, the seat foundation 24 of the first vehicle seat 12 is configured to rotate about a first rotation axis 82 between the first position and the second positions as shown in FIGS. 2 and 4. The seat foundation 24 is configured to rotate 180 degrees about the first rotation axis 82 when changing between the first position and the second position.

In other examples, the second vehicle seat 14 is arranged on the first row axis A and is spaced apart and beside the first vehicle seat 12 along the first row axis A as shown in FIG. 9. In such examples, the first vehicle seat 12 is configured to rotate about the first rotation axis 82 between the first position and a third positon in which the first vehicle seat 12 is arranged to face a third direction 84 different from the first and second directions 28, 30. The first vehicle seat 12 is configured to rotate about 90 degrees between the first and third positions.

In such examples, the second vehicle seat 14 is configured to rotate between the first position and a fourth position as shown in FIG. 9. The second vehicle seat 14 is in the fourth position when the second vehicle seat 14 is arranged to face a fourth direction 86 different from the first, second, and third directions 28, 30, 84. The second vehicle seat 14 is configured to rotate about 90 degrees between the first and fourth positions. In such examples, the command from the control unit 38 may also be configured to cause the first vehicle seat 12 to change between the first and third positions and cause second vehicle seat 14 to change between the first and fourth positions.

In other examples, the second vehicle seat 14 is arranged on the second row axis B and is spaced apart from first vehicle seat 12 along the second row axis B as shown in FIG. 10. In such examples, first vehicle seat 12 is configured to rotate between the first position and a fifth positon in which the first vehicle seat 12 is arranged to face a fifth direction 88 different from the other directions 28, 30, 84, 86. The first vehicle seat 12 is configured to rotate about 225 degrees between the first and fifth positions.

In such examples, the second vehicle seat 14 is configured to rotate between the first position and a sixth position as shown in FIG. 10. The second vehicle seat 14 is in the sixth position when the second vehicle seat 14 is arranged to face a sixth direction 90 different from the other directions 28, 30, 84, 86, 88. The second vehicle seat 14 is configured to rotate about 45 degrees between the first and sixth positions. In such examples, the command from the control unit 38 may also be configured to cause the first vehicle seat 12 to change between the first and fifth positions and cause second vehicle seat 14 to change between the first and sixth positions.

In other examples, the second vehicle seat 14 is arranged on the second row axis B and is spaced in behind the first vehicle seat 12, but in front of a third vehicle seat 15, similar to the first vehicle seat 12, which lies on the third row axis C as shown in FIG. 11. The second vehicle seat 14 is arranged in front of the third vehicle seat 15 such that the second vehicle seat 14 is configured to change between the first position and the second position and face the third vehicle seat 15.

A method of using the occupant support system 10 includes several steps. The method begins with the first vehicle seat 12 in the first position, the second vehicle seat 14 arranged behind the first vehicle seat 12, and the leg-support system 16 in the stowed arrangement as shown in FIG. 1. An occupant in the first vehicle seat 12, as suggested in FIG. 1, desiring to recline in the occupant support system 10 continues the method by providing the input 48 to the controller 46 which causes the power supply 44 to supply power to the first vehicle seat 12 and causes the first vehicle seat 12 to change to the second position as shown in FIG. 3.

In some examples, the input 48 provided by the occupant to the controller 46 may also cause the leg-support system 16 to change to the in-use arrangement as the first vehicle seat 12 changes to the second position. In other examples, the next step of the method includes the occupant providing another input 48 to the controller 46, which causes the power supply 44 to supply power to the leg-support system 16, and causes the leg-support system 16 to change to the in-use arrangement. In other examples, the occupant manually changes the leg-support system 16 to the in-use arrangement once the first vehicle seat 12 is in the second position.

In other examples, the method begins with the first vehicle seat 12 in the first position, the second vehicle seat 14 arranged beside the first vehicle seat 12, and the leg-support system 16 in the stowed arrangement. An occupant in the first vehicle seat 12 as suggested in FIG. 1 desiring to recline in the occupant support system 10 continues the method by providing the input 48 to the controller 46 which causes the power supply 44 to supply power to the first vehicle seat 12 and second vehicle seat 14. The power supplied to the first vehicle seat 12 causes the first vehicle seat 12 to change to the third position, while the power supplied to the second vehicle seat 14 causes the second vehicle seat 14 to change to the fourth position as shown in FIG. 9.

In other examples, the method begins with the first vehicle seat 12 in the first position, the second vehicle seat 14 arranged diagonally behind the first vehicle seat 12, and the leg-support system 16 in the stowed arrangement. An occupant in the first vehicle seat 12 as suggested in FIG. 1 desiring to recline in the occupant support system 10 continues the method by providing the input 48 to the controller 46 which causes the power supply 44 to supply power to the first vehicle seat 12 and second vehicle seat 14. The power supplied to the first vehicle seat 12 causes the first vehicle seat 12 to change to the fifth position, while the power supplied to the second vehicle seat 14 causes the second vehicle seat 14 to change to the sixth position as shown in FIG. 10.

In other examples, the method begins with the second vehicle seat 14 in the first position, the third vehicle seat arranged behind the second vehicle seat 14, and the leg-support system 16 in the stowed arrangement. An occupant in the first vehicle seat 12, as suggested in FIG. 1, desiring to recline in the occupant support system 10 continues the method by providing the input 48 to the controller 46 which causes the power supply 44 to supply power to the second vehicle seat 14 to cause the second vehicle seat 14 to change to the second position as shown in FIG. 11.

The occupant desiring to adjust the arrangement of one of the first vehicle seat 12 and the second vehicle seat 14 may continue the method by providing another input 48 to the controller 46 which causes the power supply 44 to supply power to one of the first vehicle seat 12 and the second vehicle seat 14. The power suppled to one of the first and second vehicle seats 12, 14 causes one of the first vehicle seat 12 and the second vehicle seat 14 to move up, down, forward, or back. In other examples, the occupant manually changes the height or distance between the vehicle seats 12, 14.

In some examples, the occupant desiring to use the massage unit 62 may continue the method by providing another input 48 to the controller 46, which causes the power supply 44 to supply power to the moveable backrest support 74 and cause the moveable backrest support 74 to change to the open position as shown in FIG. 7. The occupant continues the method by arranging the feet of the occupant in the opening 76 of the stationary backrest support 72 and in confronting relation to the foot massager 64. The occupant continues the method may providing another input 48 to the controller 46, which causes the power supply 44 to supply power to the massage unit 62 and causes the foot massager 64 to massage the lower body of the occupant. In other examples, the input 48 to the controller 46 may also cause the power supply 44 to supply power to the massage unit 62 and causes the leg massager to massage the lower body of the occupant in the occupant support system 10.

In other examples, the occupant desiring to use the massage unit 62 may manually change the moveable backrest support 74 to the open position. In some examples, the occupant desiring to increase massage effectiveness of the foot massager 64 may continue the method by providing another input 48 to the controller 46, which causes the moveable backrest support 74 to change to the closed position as shown in FIG. 8.

An occupant support system 110 is shown in FIGS. 5 and 6. The occupant support system 110 includes a first vehicle seat 112, a second vehicle seat 114, and a leg-support system 116 as shown in FIGS. 5 and 6. The second vehicle seat 114 is spaced apart from the first vehicle seat 112 to define a space 118 therebetween. The leg-support system 116 is coupled to the first vehicle seat 112 and is configured to change between a stowed arrangement as shown in FIG. 5 and an in-use arrangement as shown in FIG. 6. The leg-support system 116 is in the stowed arrangement when the leg-support system 116 is in confronting relation to the first vehicle seat 112 and spaced apart from the space 118 between the vehicle seats 112, 114. The leg-support system 116 is in the in-use arrangement when the leg-support system 116 is located in the space 118 between the first vehicle seat 112 and the second vehicle seat 114 to support part of the lower body of the occupant.

The first vehicle seat 112 includes a seat base 120, a seat back 122, and a seat foundation 124 as shown in FIGS. 5 and 6. The seat back 122 is coupled to the seat base 120. The seat foundation 124 is arranged to extend between and interconnect the seat base 120 to a floor 126 of a vehicle 127 to cause the seat base 120 and the seat back 122 to move between a first position as shown in FIG. 5 and a second position as shown in FIG. 6. The first vehicle seat 112 is in the first position when the seat base 120 and seat back 122 are arranged to face a first direction 28. The first vehicle seat 112 is in the second position when the seat base 120 and seat back 122 are arranged to face a second direction 30 different from the first direction 28.

In some examples, the seat foundation 124 of the first vehicle seat 112 is configured to rotate about a first rotation axis 182 between the first position and the second positions as shown in FIGS. 5 and 6. The seat foundation 124 is configured to rotate 180 degrees about the first rotation axis 182 when changing between the first position and the second position.

The second vehicle seat 114 includes a seat bottom 132, a seat back 134, and a seat foundation 136 as shown in FIGS. 5 and 6. The seat back 134 is coupled to the seat bottom 132. The seat foundation 136 is arranged to extend between and interconnect the seat bottom 132 to the floor 126 of the vehicle 127 to cause the second vehicle seat 114 to move back and forth and up and down relative to the floor 126 of the vehicle 127.

The leg-support system 116 includes a control unit 138 and a leg-support mechanism 140 as shown in FIGS. 5 and 6. The control unit 138 is coupled to the first vehicle seat 112 and the second vehicle seat 114. The leg-support mechanism 140 is coupled to the seat base 120 and configured to cooperate with the seat base 120 to form a seat bottom 142 of the first vehicle seat 112 when the leg-support system 116 in in the stowed arrangement. The leg-support mechanism 140 is also coupled to the control unit 138 to receive a command from the control unit 138. The command from the control unit 138 may be configured to cause the leg-support mechanism 140 to change between the stowed arrangement and the in-use arrangement. In some embodiments, the command from the control unit 138 may also be configured to cause the first vehicle seat 112 to change between the first and second positions.

The control unit 138 includes a power supply 144, a controller 146, and an input 148 as shown in FIG. 5. The power supply 144 is coupled to the first vehicle seat 112, the second vehicle seat 114, and the leg-support mechanism 140 to selectively supply power to one of the first vehicle seat 112, the second vehicle seat 114, and the leg-support mechanism 140 in response to the command from the controller 146. The controller 146 is coupled to the power supply 144 and is configured to provide the command in response to receiving the input 148 from the occupant.

The leg-support mechanism 140 includes a leg-support base 150 and an actuator 152 as shown in FIGS. 5 and 6. The leg-support base 150 is configured to move between a retracted positon when the leg-support system 116 is in the stowed arrangement and an extended position when the leg-support system 116 is in the in-use arrangement. The actuator 152 is coupled to the leg-support base 150 and the control unit 138 to cause the leg-support base 150 to move between the retracted and extended positions when the control unit 138 receives the input 148.

In some examples, the leg-support mechanism 140 further includes a pivot unit 154 as shown in FIGS. 5 and 6. The pivot unit 154 is coupled to the actuator 152 and arranged to extend between and interconnect the seat base 120 and the leg-support base 150. The pivot unit 154 causes the leg-support base 150 to rotate about a pivot axis 156 when the leg-support system 116 moves between the retracted and extended positions.

In some examples, the leg-support system 116 further includes a massage unit 162 as shown in FIGS. 5 and 6. The massage unit 162 is coupled to the first vehicle seat 112 and the control unit 138.

The massage unit 162 includes a foot massager 164 and a leg massager 166 as shown in FIGS. 5 and 6. The foot massager 164 is coupled to the seat back 134 of the second vehicle seat 114. The leg massager 166 is coupled to the leg-support base 150.

The foot massager 164 is configured to massage feet of the occupant when the occupant is in the second vehicle seat 114 when the first vehicle seat 112 is in the second position and the leg-support system 116 is in the in-use arrangement. The foot massager 164 is also configured to massage a back of the occupant when the occupant is in the first vehicle seat 112.

In some embodiments, the occupant support system 10, 110 may include two leg-support systems 16, 116 with a first leg-support system 16, 116 coupled to the first vehicle seat 12, 112 and the second leg-support system 16, 116 coupled to the second vehicle seat 14, 114.

A method of using the occupant support system 110 includes several steps. The method begins with the first vehicle seat 112 in the first position and the leg-support system 116 in the stowed arrangement as shown in FIG. 5. An occupant in the second vehicle seat 114, as suggested in FIG. 5, desiring to recline in the occupant support system 110 continues the method by providing the input 148 to the controller 146 which causes the power supply 144 to supply power to the first vehicle seat 112 and causes the first vehicle seat 112 to change to the second position as shown in FIG. 6.

In some examples, the input 148 provided by the occupant to the controller 146 may also cause the leg-support system 116 to change to the in-use arrangement as the first vehicle seat 112 changes to the second position. In other examples, the next step of the method includes the occupant providing another input 148 to the controller 146, which causes the power supply 144 to supply power to the leg-support system 116, and causes the leg-support system 116 to change to the in-use arrangement. In other examples, the occupant manually changes the leg-support system 116 to the in-use arrangement once the first vehicle seat 112 is in the second position.

The following numbered clauses include embodiments that are contemplated and non-limiting:

Clause 1. An occupant support system comprising a first vehicle seat including a seat bottom, a seat back coupled to the seat bottom, and a seat foundation arranged to extend between and interconnect the seat bottom to a floor of a vehicle to cause the seat bottom and the seat back to move between a first position in which the first vehicle seat is arranged to face a first direction and a second position in which the first vehicle seat is arranged to face a second direction different than the first direction.

Clause 2. The occupant support system of clause 1, any other clause, or combination of clauses, further comprising a second vehicle seat spaced part from the first vehicle seat to define a space therebetween, the second vehicle seat including a seat base, a seat back coupled to the seat base, and a seat foundation arranged to extend between and interconnect the seat base to the floor of the vehicle to cause the second vehicle seat to move back and forth and up and down relative to the floor of the vehicle.

Clause 3. The occupant support system of claim 2, any other clause, or combination of clauses, further comprising a leg-support system coupled to the seat base of the second vehicle seat and configured to change between a stowed arrangement in which the leg-support system is in confronting relation to the seat base of the second vehicle seat and located outside the space between the first vehicle seat and the second vehicle seat and an in-use arrangement in which the leg-support system is arranged to extend into the space between the first vehicle seat and the second vehicle seat.

Clause 4. The occupant support system of claim 3, any other clause, or combination of clauses, wherein the leg-support system is configured to support a lower body of an occupant that extends into the space between the first vehicle seat and the second vehicle seat when the first vehicle seat is in the second position and the leg-support system is in the in-use arrangement.

Clause 5. The occupant support system of clause 4, any other clause or combination of clauses, wherein the leg-support system includes a control unit configured to provide a command in response to receiving an input and a leg-support mechanism coupled to the control unit to receive the command from the control unit to cause the leg-support mechanism to change between the stowed arrangement and the use arrangement.

Clause 6. The occupant support system of clause 5, any other clause or combination of clauses, wherein the leg-support mechanism is coupled to the seat base of the second vehicle seat and configured to cooperate with the seat base to establish a seat bottom of the second vehicle seat when the leg-support system in in the stowed arrangement.

Clause 7. The occupant support system of clause 6, any other clause or combination of clauses, wherein the leg-support mechanism includes a leg-support base configured to move between a retracted positon when the leg-support system is in the stowed arrangement and an extended position when the leg-support system is in the in-use arrangement and an actuator coupled to the leg-support base and the control unit to cause the leg-support base to move between the retracted and extended positions when the control unit receives the input.

Clause 8. The occupant support system of clause 7, any other clause or combination of clauses, wherein the leg-support mechanism further includes a pivot unit arranged to extend between and interconnect the seat base and the leg-support base to cause the leg-support base to rotate about a pivot axis when the leg-support system moves between the retracted and extended positions.

Clause 9. The occupant support system of clause 7, any other clause, or combination of clauses, wherein the actuator is a spring.

Clause 10. The occupant support system of clause 7, any other clause, or combination of clauses, wherein the actuator is a worm screw.

Clause 11. The occupant support system of clause 7, any other clause, or combination of clauses, wherein the actuator is an electronic actuator.

Clause 12. The occupant support system of clause 7, any other clause, or combination of clauses, wherein the actuator is a gas shock actuator.

Clause 13. The occupant support system of clause 5, any other clause or combination of clauses, wherein the leg-support system further includes a massage unit coupled to the second vehicle seat and the control unit, the massage unit including a foot massager coupled to the seat back of the second vehicle seat and a leg massager coupled to the leg-support base.

Clause 14. The occupant support system of clause 13, any other clause or combination of clauses, wherein the seat back of the second vehicle seat includes a seat-back frame coupled to the seat bottom, a stationary backrest support fixed to the seat-back frame, and a moveable backrest support coupled to the stationary backrest support and configured to move between a closed positon in which the moveable backrest support fits within an opening formed in the stationary backrest support and an open position in which the moveable backrest support is spaced apart from the opening in the stationary backrest support to allow access to the opening in the stationary backrest support.

Clause 15. The occupant support system of clause 14, any other clause or combination of clauses, wherein the foot massager is coupled to the stationary backrest support within the opening so that the moveable backrest support blocks selectively access to the foot massager when the moveable backrest moves between the open and closed positions.

Clause 16. The occupant support system of clause 4, any other clause or combination of clauses, wherein the seat foundation of the first vehicle seat is configured to rotate about a first rotation axis between the first position and the second position.

Clause 17. The occupant support system of clause 16, any other clause or combination of clauses, wherein the first vehicle seat rotates 180 degrees between the first position and the second position.

Clause 18. The occupant support system of clause 17, any other clause or combination of clauses, wherein the seat bottom of the first vehicle seat includes a seat base coupled to the seat foundation and a seat-bottom cushion coupled to the seat base.

Clause 19. An occupant support system comprising
a first vehicle seat configured to move between a first position in which the first vehicle seat is arranged to face a first direction and a second position in which the first vehicle seat is arranged to face a second direction different than the first direction.

Clause 20. The occupant support system of clause 19, any other clause or combination of clauses, further comprising a second vehicle seat spaced part from the first vehicle seat to define a space therebetween.

Clause 21. The occupant support system of clause 20, any other clause or combination of clauses, further comprising at least one leg-support system coupled to one of the first vehicle seat and the second vehicle seat and configured to change between a stowed arrangement in which the leg-support system is in confronting relation to one of the first vehicle seat and the second vehicle seat and located outside the space between the first vehicle seat and the second vehicle seat and an in-use arrangement in which the leg-support system is arranged to extend into the space between the first vehicle seat and the second vehicle seat.

Clause 22. The occupant support system of clause 21, any other clause or combination of clauses, wherein the at least one leg-support system is configured to support a lower body of an occupant that extends into the space between the first vehicle seat and the second vehicle seat when the first vehicle seat is in the second position and the leg-support system is in the in-use arrangement.

Clause 23. The occupant support system of clause 22, any other clause or combination of clauses, wherein the at least one leg-support system includes a control unit and a leg-support mechanism coupled to the control unit to receive an input from the control unit to cause the leg-support mechanism to change between the stowed arrangement and the in-use arrangement.

Clause 24. The occupant support system of clause 23, any other clause or combination of clauses, wherein each of the first vehicle seat and the second vehicle seat include a seat base, a seat back coupled to the seat bottom, and a seat foundation arranged to extend between and interconnect the seat bottom to a floor of a vehicle.

Clause 25. The occupant support system of clause 24, any other clause or combination of clauses, wherein the leg-support mechanism is coupled to the seat base of one of the first vehicle seat and the second vehicle seat and configured to cooperate with the seat base to form a seat bottom when the leg-support system in in the stowed arrangement.

Clause 26. The occupant support system of clause 25, any other clause or combination of clauses, wherein the at least one leg-support system further includes a massage unit coupled to one of the first vehicle seat and the second vehicle seat and the control unit, the massage unit including a foot massager coupled to the seat back and a leg massager coupled to the leg-support mechanism.

Clause 27. The occupant support system of clause 26, any other clause or combination of clauses, wherein the at least one leg-support system is coupled to the first vehicle seat.

Clause 28. The occupant support system of clause 27, any other clause or combination of clauses, wherein the first vehicle seat is configured to rotate about a first rotation axis between the first position and the second position.

Clause 29. The occupant support system of clause 28, any other clause or combination of clauses, wherein the first vehicle seat rotates 180 degrees between the first position and the second position.

Clause 30. The occupant support system of clause 22, any other clause or combination of clauses, wherein the occupant support system includes two leg-support systems with a first leg-support system coupled to the first vehicle seat and a second leg-support system coupled to the second vehicle seat.

The invention claimed is:

1. An occupant support system comprising
a first vehicle seat including a seat bottom, a seat back coupled to the seat bottom to extend outwardly from the seat bottom, and a seat foundation arranged to extend between and interconnect the seat bottom to a floor of a vehicle to cause the seat bottom and the seat back to move between a first position in which the first vehicle seat is arranged to face a first direction and a second position in which the first vehicle seat is arranged to face a second direction different than the first direction,
a second vehicle seat spaced part from the first vehicle seat to define a space therebetween, the second vehicle seat including a seat base, a seat back coupled to the seat base to extend outwardly from the seat bottom, and a seat foundation arranged to extend between and interconnect the seat base to the floor of the vehicle to cause the second vehicle seat to move back and forth and up and down relative to the floor of the vehicle, and
a leg-support system coupled to the seat base of the second vehicle seat and configured to change between a stowed arrangement in which the leg-support system is in confronting relation to the seat base of the second vehicle seat and located outside the space between the first vehicle seat and the second vehicle seat and an in-use arrangement in which the leg-support system is arranged to extend into the space between the first vehicle seat and the second vehicle seat,
wherein the leg-support system is configured to support a lower body of an occupant that extends into the space between the first vehicle seat and the second vehicle seat when the first vehicle seat is in the second position and the leg-support system is in the in-use arrangement,
wherein the leg-support system includes a control unit configured to provide a command in response to receiving an input and a leg-support mechanism coupled to the control unit to receive the command from the control unit to cause the leg-support mechanism to change between the stowed arrangement and the use arrangement.

2. The occupant support system of claim 1, wherein the leg-support mechanism is coupled to the seat base of the second vehicle seat and configured to cooperate with the seat base to establish a seat bottom of the second vehicle seat when the leg-support system in in the stowed arrangement.

3. The occupant support system of claim 2, wherein the leg-support mechanism includes a leg-support base configured to move between a retracted positon when the leg-support system is in the stowed arrangement and an extended position when the leg-support system is in the in-use arrangement and an actuator coupled to the leg-support base and the control unit to cause the leg-support base to move between the retracted and extended positions when the control unit receives the input.

4. The occupant support of claim 3, wherein the leg-support mechanism further includes a pivot unit arranged to extend between and interconnect the seat base and the leg-support base to cause the leg-support base to rotate about a pivot axis when the leg-support system moves between the retracted and extended positions.

5. The occupant support system of claim 3, wherein the actuator is a spring.

6. The occupant support system of claim 1, wherein the leg-support system further includes a massage unit coupled to the second vehicle seat and the control unit, the massage unit including a foot massager coupled to the seat back of the second vehicle seat and a leg massager coupled to the leg-support base.

7. The occupant support system of claim 6, wherein the seat back of the second vehicle seat includes a seat-back frame coupled to the seat bottom, a stationary backrest support fixed to the seat-back frame, and a moveable backrest support coupled to the stationary backrest support and configured to move between a closed positon in which the moveable backrest support fits within an opening formed in the stationary backrest support and an open position in which the moveable backrest support is spaced apart from the opening in the stationary backrest support to allow access to the opening in the stationary backrest support.

8. The occupant support system of claim 7, wherein the foot massager is coupled to the stationary backrest support within the opening so that the moveable backrest support blocks selectively access to the foot massager when the moveable backrest moves between the open and closed positions.

9. The occupant support system of claim 1, wherein the seat foundation of the first vehicle seat is configured to rotate about a first rotation axis between the first position and the second position.

10. The occupant support system of claim 9, wherein the first vehicle seat rotates 180 degrees between the first position and the second position.

11. The occupant support system of claim 10, wherein the seat bottom of the first vehicle seat includes a seat base coupled to the seat foundation and a seat-bottom cushion coupled to the seat base.

12. An occupant support system comprising
a first vehicle seat including a seat bottom and a seat back coupled to the seat bottom to extend outwardly from the seat bottom, the first vehicle seat configured to move between a first position in which the first vehicle seat is arranged to face a first direction and a second position in which the first vehicle seat is arranged to face a second direction different than the first direction, a second vehicle seat including a seat bottom and a seat back coupled to the seat bottom to extend outwardly from the seat bottom, the second vehicle seat spaced apart from the first vehicle seat to define a space therebetween, and at least one leg-support system coupled to one of the first vehicle seat and the second vehicle seat and configured to change between a stowed arrangement in which the leg-support system is in confronting relation to one of the first vehicle seat and the second vehicle seat and located outside the space between the first vehicle seat and the second vehicle seat and an in-use arrangement in which the leg-support system is arranged to extend into the space between the first vehicle seat and the second vehicle seat, wherein the at least one leg-support system is configured to support a lower body of an occupant that extends into the space between the first vehicle seat and the second vehicle seat when the first vehicle seat is in the second position and the leg-support system is in the in-use arrangement, wherein the at least one leg-support system includes a control unit and a leg-support mechanism coupled to the control unit to receive an input from the control unit to cause the leg-support mechanism to change between the stowed arrangement and the in-use arrangement.

13. The occupant support system of claim 12, wherein each of the first vehicle seat and the second vehicle seat include a seat base, a seat back coupled to the seat bottom, and a seat foundation arranged to extend between and interconnect the seat bottom to a floor of a vehicle, and wherein the leg-support mechanism is coupled to the seat base of one of the first vehicle seat and the second vehicle seat and configured to cooperate with the seat base to form a seat bottom when the leg-support system in in the stowed arrangement.

14. The occupant support system of claim 13, wherein the at least one leg-support system further includes a massage unit coupled to one of the first vehicle seat and the second vehicle seat and the control unit, the massage unit including a foot massager coupled to the seat back and a leg massager coupled to the leg-support mechanism.

15. The occupant support system of claim 12, wherein the at least one leg-support system is coupled to the first vehicle seat.

16. The occupant support system of claim 15, wherein the first vehicle seat is configured to rotate about a first rotation axis between the first position and the second position.

17. The occupant support system of claim 16, wherein the first vehicle seat rotates 180 degrees between the first position and the second position.

18. The occupant support system of claim 12, wherein the occupant support system includes two leg-support systems with a first leg-support system coupled to the first vehicle seat and a second leg-support system coupled to the second vehicle seat.

* * * * *